US010206179B2

(12) United States Patent
Weber et al.

(10) Patent No.: US 10,206,179 B2
(45) Date of Patent: Feb. 12, 2019

(54) APPARATUS, METHOD AND COMPUTER PROGRAM FOR A BASE STATION TRANSCEIVER

(71) Applicant: Alcatel Lucent, Boulogne Billancourt (FR)

(72) Inventors: Andreas Weber, Stuttgart (DE); Oliver Stanze, Stuttgart (DE); Antoni Bestard Bennasar, Stuttgart (DE); Martin Link, Stuttgart (DE)

(73) Assignee: Alcatel Lucent, Paris (FR)

( * ) Notice: Subject to any disclaimer, the term of this patent is extended or adjusted under 35 U.S.C. 154(b) by 181 days.

(21) Appl. No.: 14/412,400

(22) PCT Filed: Jun. 21, 2013

(86) PCT No.: PCT/EP2013/062978
§ 371 (c)(1),
(2) Date: Dec. 31, 2014

(87) PCT Pub. No.: WO2014/005855
PCT Pub. Date: Jan. 9, 2014

(65) Prior Publication Data
US 2015/0189603 A1 Jul. 2, 2015

(30) Foreign Application Priority Data
Jul. 2, 2012 (EP) .................................. 12305797

(51) Int. Cl.
*H04W 52/26* (2009.01)
*H04W 24/08* (2009.01)
(Continued)

(52) U.S. Cl.
CPC ......... *H04W 52/265* (2013.01); *H04W 24/08* (2013.01); *H04W 24/10* (2013.01);
(Continued)

(58) Field of Classification Search
CPC ... H04W 52/265; H04W 24/08; H04W 24/10; H04W 84/042
See application file for complete search history.

(56) References Cited

U.S. PATENT DOCUMENTS

2009/0092059 A1* 4/2009 Fu ..................... H04W 72/082
370/252
2011/0013582 A1 1/2011 Ding et al.
(Continued)

FOREIGN PATENT DOCUMENTS

CN 101541012 A 9/2009
WO WO 2012/061982 A1 5/2012

OTHER PUBLICATIONS

Wang et al. "Performance Analysis of Enhanced Inter-cell Interference Coordination in LTE-Advanced Heterogeneous Networks," Vehicular Technology Conference (VTC Spring), 2012 IEEE 75th, ISBN: 978-1-4673-0989-9 (pp. 1-5).*
(Continued)

*Primary Examiner* — Michael Thier
*Assistant Examiner* — Brian P Cox
(74) *Attorney, Agent, or Firm* — Fay Sharpe LLP

(57) ABSTRACT

Embodiments relate to an apparatus, a method and a computer program for a base station transceiver (100) for a mobile communication system (300). The base station transceiver (100) is operable in a coverage area (205) of another base station transceiver (200). The other base station transceiver (200) is operable to transmit radio signals in a repetitive sequence of radio frames, wherein in at least one of the radio frames in the sequence the other base station transceiver (200) is operable to transmit with a reduced transmission power or to suspend transmission compared to at least one other of the radio frames in the sequence. The apparatus (10) comprises an interface (12) operable to receive sequence information on the at least one of the radio
(Continued)

frames in the sequence, during which the other base station transceiver (200) is operable to transmit with the reduced transmission power or to suspend transmission compared to the at least one other of the radio frames in the sequence. The apparatus (10) further comprises a controller (14) operable to determine configuration information on a measurement configuration for a mobile transceiver (400) associated to the base station transceiver (100), wherein the configuration information comprises information on a signal quality measurement at the mobile transceiver (400) on radio signals received from the base station transceiver (100). The signal quality measurement is performed during a time interval with a duration being predetermined by the mobile transceiver (400). The controller (14) is further operable to determine duration information on the duration of the time interval and the controller (14) is operable to determine the configuration information based on the sequence information and the duration information.

15 Claims, 9 Drawing Sheets

(51) Int. Cl.
*H04W 36/00* (2009.01)
*H04W 24/10* (2009.01)
*H04W 72/12* (2009.01)
*H04W 84/04* (2009.01)

(52) U.S. Cl.
CPC ........ *H04W 36/0088* (2013.01); *H04W 72/12* (2013.01); *H04W 84/042* (2013.01); *H04W 84/045* (2013.01); *Y02D 70/1222* (2018.01); *Y02D 70/1226* (2018.01); *Y02D 70/1242* (2018.01); *Y02D 70/1262* (2018.01); *Y02D 70/1264* (2018.01); *Y02D 70/146* (2018.01)

(56) References Cited

U.S. PATENT DOCUMENTS

| | | | |
|---|---|---|---|
| 2012/0082052 A1 | 4/2012 | Oteri et al. | |
| 2012/0120846 A1* | 5/2012 | Hwang | H04W 24/10 370/254 |
| 2012/0157082 A1 | 6/2012 | Pedersen et al. | |
| 2013/0021925 A1* | 1/2013 | Yin | H04B 7/024 370/252 |
| 2013/0114428 A1* | 5/2013 | Koivisto | H04B 7/024 370/252 |
| 2013/0229971 A1* | 9/2013 | Siomina | H04W 24/10 370/312 |
| 2013/0258874 A1* | 10/2013 | Khoshnevis | H04L 5/0057 370/252 |
| 2013/0286849 A1* | 10/2013 | Park | H04B 7/024 370/241 |
| 2015/0110024 A1* | 4/2015 | Manssour | H04W 72/1273 370/329 |

OTHER PUBLICATIONS

Nokia Siemens Networks et al., "Details of restricted CSI measurements," 3$^{rd}$ Generation Partnership Project (3GPP), 3GPP TSG RAN WG1 Meeting #63, R1-106217, XP050489795, 2 pages, Jacksonville, USA, Nov. 14-18, 2010.

International Search Report for PCT/EP2013/062978 dated Aug. 26, 2013.

* cited by examiner

APPARATUS, METHOD AND COMPUTER PROGRAM FOR A BASE STATION TRANSCEIVER

Embodiments of the present invention relate to mobile communications, more particularly but not exclusively to radio resource management for a base station transceiver for a mobile communication system.

BACKGROUND

In mobile communication networks heterogeneous architectures become more and more important. Heterogeneous Networks (HetNets) are networks, which utilize cell types of different sizes, as, for example, macro cells and small cells, such as metro cells, micro or pico cells, and femto cells. Such cells are established by base station transceivers for which their coverage areas are determined by their transmission power and interference condition. Small cells are cells having a smaller coverage area than macro cells. In some network scenarios the small cells' coverage area can be surrounded by the coverage area of a macro cell. The small cells can be deployed to extend the capacity of the network.

With regard to standardization, within the 3$^{rd}$ Generation Partnership Project (3GPP), HetNets have been added to the scope of the Long Term Evolution-Advanced (LTE-A) work item. Since the cells or base stations in such networks may utilize the same frequency resources, such architectures can suffer from interference created by the overlapping coverage areas of these cells. Therefore enhanced Inter-Cell Interference Coordination (eICIC) for co-channel HetNet deployment is one of the key techniques for LTE Release 10 (Rel-10). Co-channel HetNets comprise macro cells and small cells operating on the same frequency channel. Such deployments present some specific interference scenarios for which eICIC techniques are utilized.

In one example scenario, the small cells are open to users of the macro cell network. In order to ensure that such small cells carry a useful share of the total traffic load, User Equipment (UE) or mobile transceivers may be programmed or configured to associate preferentially with the small cells rather than the macro cells, for example, by biasing the Signal-to-Interference-and-Noise Ratio (SINR) or a Reference Signal Receive Power (RSRP) threshold at which they will select a small cell to associate with. Under such conditions, UEs near the edge of a small cell's coverage area may suffer strong interference from one or more macro cells. In order to alleviate such interference, some radio frames or sub-frames may be configured as "blank" or "almost blank" in a macro cell. A blank sub-frame may contain no transmission from the macro cell, while an "almost blank" sub-frame typically contains no payload data transmission and little or no control signaling transmission, but may contain reference signal transmissions in order to ensure backward compatibility with legacy terminals, which expect to find the reference signals for measurements but are unaware of the configuration of almost blank sub-frames. Almost blank sub-frames may also contain synchronization signals, broadcast control information and/or paging signals. The utilization of "blank" or "almost blank" sub-frames enables reduced or even suppressed interference for the small cell within these sub-frames. Hence, "blank" or "almost blank" sub-frames may be regarded as radio frames or sub-frames during which at least some radio resources are suspended from transmission, i.e. the transmission power of a macro cell may be reduced on these radio resources.

However, to make use of blank or Almost Blank Sub-frames (ABSs) effectively (note that the term "ABS" is used, and should be understood to include both blank and almost blank sub-frames), signaling may be utilized from the macro cell to the small cell, e.g. across the corresponding backhaul interface, known in LTE as the "X2" interface. For LTE Rel 10, it has been agreed that this X2 signaling will take the form of a coordination bitmap to indicate the ABS pattern (for example with each bit corresponding to one sub-frame in a series of sub-frames, with the value of the bit indicating whether the sub-frame is an ABS or not). Such signaling can help the small cell to schedule data transmissions in the small cell appropriately to avoid interference (e.g. by scheduling transmissions to UEs near the edge of the small cell during ABSs), and to signal to the UEs the sub-frames, which should have low macro cellular interference and should therefore be used for measurements. Examples for such measurements are measurements for Radio Resource Management (RRM), which typically relate to handover, measurements for Radio Link Monitoring (RLM), which typically relate to detection of serving radio link failure, and measurements for Channel State Information (CSI), which typically relate to link adaptation on the serving radio link.

In such an example scenario, Radio Resource Control (RRC) signaling can be utilized to indicate to the UEs the set of sub-frames which they should use for measurements (e.g., for RLM/RRM or CSI), where RRC is a signaling protocol standardized by 3GPP for control and configuration signaling.

Another example scenario can arise with HetNets in which the small cells operate on a Closed Subscriber Group (CSG) basis, and are therefore typically not open to users of the macro cellular network. In this case, the small cells can cause strong interference to the macro cell UEs when these macro cell UEs come close to the small cell base station transceivers, however, without having the possibility to associate with them. It may then be beneficial for the macro cells to indicate to their UEs the sub-frames in which they should make resource specific measurements, i.e. the sub-frames in which interference from one or more small cells is reduced or absent. In the following, to a base station transceiver may also be referred to as NodeB (NB) or an eNodeB (eNB) according to the 3GPP terminology.

Document US 2012/082052 A1 discloses a system and method for coordinating different types of base stations in a heterogeneous communications system. A method of communications controller operations includes signaling an indicator of a subset of a plurality of communications resources controlled by a communications controller to a user equipment, and receiving a report comprising channel information associated with a measurement of signals transmitted in the subset from the user equipment.

SUMMARY

Embodiments are based on the finding that mobiles, which are not compatible to eICIC and which are attached to a biased pico cell in HetNets that apply the Rel. 10 feature eICIC, may not be able to receive and interpret eICIC signaling information. It is another finding that pico cells, metro cells, or small cells in general can be deployed inside the footprint of another cell, such as a macro cell or a neighbor cell. In order to let more mobiles benefit from the additional bandwidth introduced into the system, a handover decision may consider the so called bias value in order to push mobiles into the pico cell although the Reference Signal Received Power (RSRP), e.g. in dB, of the pico cell is by the value of the bias smaller than the RSRP of the macro cell. To support small cell border mobiles, i.e. mobiles which are located at the cell edge of the small cell, with resources of good channel quality (SINR) the macro cell may not use a certain percentage of the radio frames or sub-frames for data transmission. The so-called ABSs can be organized in a periodic pattern or sequence of, e.g. in LTE Rel. 10 of 40 ms duration. It is a further finding that the small cell may receive information about the sequence, i.e. the ABS pattern may be known by the small cell.

According to another finding Rel. 10 mobiles can be able to report up to two separate DownLink (DL) Channel Quality Indicators (CQI) by restricting their measurements to the predefined pattern of ABS or non-ABS sub-frames. The respective patterns can be signaled to the small cell's mobiles using up to two bit patterns (in case of LTE each bit pattern is of length 40). Furthermore, due to this restriction of DL CQI measurements on macro ABS and/or macro non-ABS the CQI feedback can be directly used for DL transmissions in the respective situation (macro ABS/macro non-ABS). Similar considerations apply to a scenario with a CSG cell, e.g. a femto cell, to which UEs associated to an overlapping macro cell may not handover to. In this case, the macro UEs can be informed on the bit pattern used by the CSG cell and can take these pattern into account for their CQI measurements. Due to this restriction of DL CQI measurements on CSG-ABS and/or CSG-non-ABS the CQI feedback can be directly used for DL transmissions in the respective situation (CSG-ABS/CSG-non-ABS).

It is a further finding that Rel. 8/9 mobiles attached to small or pico cells may not be aware of the periodic blanking pattern of other cells, e.g. a surrounding macro cell. Accordingly, Rel. 8/9 mobiles attached to any cell may not be aware of the periodic blanking pattern of other CSG cells, e.g. a nearby CSG small cell. Therefore they may not be able to restrict their measurements on only one kind of resources, i.e. protected/non-protected resources corresponding to ABS/non-ABS. Hence, they may only report a single CQI value to the serving eNB. Because this CQI value may be determined on measurements in ABS and non-ABS, the reported value may neither directly reflect the situation in ABS nor the situation in non-ABS. It is a further finding that in general the reported value may be too optimistic for non-ABS and too pessimistic for ABS. Therefore, the direct application of the reported CQI value may cause significant degradation of the system performance.

Embodiments are further based on the finding that the reported single CQI value can be influenced by the ABS sequence relative to a measurement time interval.

Embodiments are further based on the finding that the reported single CQI value may be influenced by the eNB to determine more reliable CQI values for ABS or non-ABS or both. Moreover, the eNB may have insufficient information regarding how the Rel. 8/9 mobiles determined the CQI value. LTE Rel. 8/9 mobiles may measure their CQI based on signal, noise, and interference strengths. In general, it may be unknown how they exactly perform the measurement and this may be different from UE to UE. However, it may be reasonable to measure the signal strength instantaneously, while interference-plus-noise is averaged based on a filter in order to compensate flashlight effects caused by dynamic precoding and on/off effects caused by dynamic traffic demand in the interfering cells. The characteristic for the interference-plus-noise filter may also be unknown at the base station transceiver, hence the time interval during which a UE carries out these measurements is not known. The filter may, for example, be exponential or sliding window based. Furthermore, it may be unknown whether the signal itself is measured instantaneously or filter based.

It is to be noted that in embodiments exponential windows may be utilized for such filters. An exponential window may not have a defined beginning or end, at least when looking at the theoretical progression, because of the exponential characteristic. For example, the beginning of such a filter may not be defined. In such a case the beginning of a measurement or time interval can be defined by using the first value, which is weighted by more than a certain threshold, e.g. 1%, 2%, 5%, 10%, 20%, 1/e, etc. Similar considerations hold for the end of such an interval. Another definition may be determined by the number of subsequent radio frames, which have a significant influence on the output of the filter. This definition may be applied to any filter characteristic. For example, the duration of the measurement or time interval may be determined by the number of radio frames, during which the measured values influence the output of the filter by more than e.g. 1%, 2%, 5%, 10%, 20%, 1/e, etc. Furthermore, it may be noted that such measurements may be repeated for a number of times in order to average noise and interference effects, such as flashlight effects and varying interference. Varying interference may be caused by interferers using different radio resources, changes between used and unused radio resources, different precoding settings of the interferers, e.g. changes in the Precoding Matrix Index (PMI), etc.

It is a further finding that difficulties a base station transceiver or eNB may have to directly transfer the single reported CQI value into separate CQI values for ABS and non-ABS can be overcome. A base station transceiver or eNB may correct insufficient information regarding the CQI measurements of the Rel. 8/9 mobiles by overcoming a lack of knowledge about which fraction of the reported CQI value depends on measurements during ABS and which fraction of the reported CQI value depends on measurements during non-ABS.

Moreover, aside from the length of the measurement time interval or window, its exact position may be unknown. The base station transceiver may configure the reporting of the measurement to a certain radio frame, e.g. in relation to the radio frames of the ABS sequence; however, this may set or determine the time of reporting. The length, start and end of the time interval may remain unknown. Embodiments are further based on the finding that the reported single CQI value can be influenced by the ABS sequence and/or the window/time interval position. That is to say the window length in relation to the pattern of an ABS-sequence can influence the quality of the measurement. For example, for a given duration of the measurement time interval the position of the measurement interval or the sequence may be adapted such that the time interval coincides with only ABS or non-ABS in the sequence.

Embodiments are based on the finding that mobile transceivers, and also Rel. 8/9 mobiles, which are attached to a cell can be configured to perform their CQI measurements using a period that is in accordance or aligned to the ABS period of an overlapping cell, where the ABS period is the time in which the order of ABS and non-ABS inside the ABS pattern repeats. The CQI measurement period of Rel. 8/9 mobiles or mobile transceivers inside a cell, e.g. a pico or small cell, but also a cell with an overlapping CSG cell, can be related to the ABS period or a multiple of the ABS period of an overlapping cell, e.g. a surrounding macro eNB or a CSG cell.

Embodiments provide an apparatus for a base station transceiver for a mobile communication system. Hence, embodiments may provide said apparatus to be operated in or by a base station transceiver. The apparatus will also be referred to as base station transceiver apparatus. Embodiments may also provide a base station transceiver comprising said base station transceiver apparatus. The base station transceiver may be operable in a mobile communication network, i.e. embodiments may provide said apparatus to be operated by or included in a base station transceiver.

In embodiments the mobile communication system may, for example, correspond to one of the $3^{rd}$ Generation Partnership Program (3GPP)-standardized mobile communication networks, where the term mobile communication system is used synonymously to mobile communication network. The mobile or wireless communication system may correspond to, for example, a Long-Term Evolution (LTE), an LTE-Advanced (LTE-A), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc., or mobile communication networks with different standards, for example, a Worldwide Inter-operability for Microwave Access (WIMAX) network.

The base station transceiver can be operable to communicate with one or more active mobile transceivers and the base station transceiver is located in a coverage area of at least one other base station transceiver, e.g. a macro cell base station transceiver or an overlapping CSG cell. Hence, embodiments may provide a mobile communication system comprising one or more mobile transceivers and base station transceivers, wherein the base station transceivers may establish macro cells or small cells, as e.g. pico-, metro, or femto cells. A mobile transceiver may correspond to a smartphone, a cell phone, user equipment, a laptop, a notebook, a personal computer, a Personal Digital Assistant (PDA), a Universal Serial Bus (USB)-stick, a car, etc. A mobile transceiver may also be referred to as User Equipment (UE) or mobile in line with the 3GPP terminology.

A base station transceiver can be located in the fixed or stationary part of the network or system. A base station transceiver may correspond to a remote radio head, a transmission point, an access point, a macro cell, a small cell, a micro cell, a femto cell, a metro cell etc. A base station transceiver can be a wireless interface of a wired network, which enables transmission of radio signals to a UE or mobile transceiver. Such a radio signal may comply with radio signals as, for example, standardized by 3GPP or, generally, in line with one or more of the above listed systems. Thus, a base station transceiver may correspond to a NodeB, an eNodeB, a BTS, an access point, a remote radio head, a transmission point etc., which may be further subdivided in a remote unit and a central unit.

A mobile transceiver can be associated with the base station transceiver or cell. The term cell refers to a coverage area of radio services provided by a base station transceiver, e.g. a NodeB, an eNodeB, a remote radio head, a transmission point, etc. A base station transceiver may operate multiple cells on one or more frequency layers, in some embodiments a cell may correspond to a sector. For example, sectors can be achieved using sector antennas, which provide a characteristic for covering an angular section around a remote unit or base station transceiver. In some embodiments, a base station transceiver may, for example, operate three or six cells covering sectors of 120° (in case of three cells), 60° (in case of six cells) respectively. A base station transceiver may operate multiple sectorized antennas.

In other words, in embodiments the mobile communication system may correspond to a HetNet, which utilizes cell types of different sizes, as, for example, macro cells and small cells, where the coverage area of a small cell is smaller than the coverage area of a macro cell. A small cell may correspond to a metro cell, a micro cell, a pico cell, a femto cell, etc. Such cells are established by base station transceivers for which their coverage areas are determined by their transmission power and interference condition. In some embodiments a small cell's coverage area can be surrounded by the coverage area of a macro cell established by another base station transceiver. In other embodiments a CSG cell is located in the coverage area of a base station transceiver, where the CSG cell is established by another base station transceiver. Small cells can be deployed to extend the capacity of the network. A metro cell may therefore be used to cover a smaller area than a macro cell, e.g. a metro cell may cover a street or a section in a metropolitan area. For a macro cell the coverage area may have a diameter in the order of one or more kilometers, for a micro cell the coverage area may have a diameter below a kilometer, and for a pico cell the coverage area may have a diameter below a 100 m. A femto cell may be the smallest cell and it may be used to cover a household or gate section at the airport, i.e. its coverage area may have a diameter below 50 m. A base station transceiver may also be referred to as cell.

In embodiments, the base station transceiver is operable in a coverage area of another base station transceiver. The base station transceiver may be a serving cell or serving base station transceiver for the mobile transceiver, the other base station transceiver may also be referred to as interfering base station transceiver subsequently. The interfering base station transceiver may correspond to a macro cell base station transceiver surrounding the base station transceiver, which may establish a small cell, or it may correspond to a CSG cell in the coverage of the base station transceiver. The other base station transceiver, e.g. the surrounding macro cell or the CSG cell, is operable to transmit radio signals in a repetitive sequence of radio frames, wherein in at least one of the radio frames in the sequence the other base station transceiver is operable to transmit with a reduced transmission power or to suspend transmission, e.g. an ABS, compared to at least one other of the radio frames in the sequence, e.g. a non-ABS. The base station transceiver apparatus comprises an interface, which is operable to receive sequence information on the at least one of the radio frames in the sequence, during which the other base station transceiver is operable to transmit with the reduced transmission power or to suspend transmission, e.g. the ABS, compared to the at least one other of the radio frames in the sequence, e.g. the non-ABS.

In embodiments the interface may correspond to any means for receiving and/or means for transmitting, and it can be implemented as a wireless or a wired interface, which allows communicating directly or indirectly information about the other base station transceiver, e.g. information about an ABS pattern used by the other base station transceiver. For example, in an LTE or LTE-A embodiment the interface may correspond to the X2 interface and protocol, which was standardized for inter eNB communication by 3GPP. Hence, in embodiments the base station transceiver can be coupled to the other base station transceiver. In other words, the interface may be operable to receive the sequence information on the at least one of the radio frames in the sequence, during which the other base station transceiver is operable to transmit with the reduced transmission power or to suspend transmission compared to the at least one other of the radio frames in the sequence from the other base station transceiver.

The base station transceiver apparatus further comprises a controller, which is operable to determine configuration information on a measurement configuration for a mobile transceiver associated to the base station transceiver. The controller may correspond to any means for controlling, such as a processor, a microcontroller, a central processing unit, a digital signal processor, etc. The configuration information comprises information on a signal quality measurement at the mobile transceiver on radio signals received from the base station transceiver.

The signal quality measurement is performed during a time interval with a duration, which is predetermined by the mobile transceiver. The controller is further operable to determine duration information on the duration of the time interval. The controller is operable to determine the configuration information based on the sequence information and the duration information. That is to say that the apparatus may determine measurement configuration information for an associated UE taking into account the duration of the time interval. Moreover, the configuration for protected resources, e.g. ABS and non-ABS, of the other base station transceiver may be taken into account. In some embodiments, a small cell base station transceiver may determine measurement configuration information for an associated UE taking into account the configuration for protected resources, e.g. ABS and non-ABS, of a surrounding macro cell base station transceiver. In other embodiments a base station transceiver may determine measurement configuration information for an associated UE taking into account the configuration for protected resources, e.g. ABS and non-ABS, of an overlapping CSG cell. In other words, the controller can be operable to determine the configuration information on the measurement configuration comprising information on measurements on a reception quality of radio signals received by the mobile transceiver from the base station transceiver during one or more radio frames of the sequence based on the duration information.

Hence, the controller is operable to determine duration information and once the duration information has been determined, the configuration information can be further adapted and therewith the time relation between the measurement at the mobile transceiver and the sequence. The information on the measurement configuration, i.e. the configuration information, may comprise information on a periodic signal quality measurement at the mobile transceiver on radio signals received from the base station transceiver during the time interval. That is to say, the UE measurement can be configured relative to the sequence of protected resources, e.g. ABS, of the other base station transceiver such that the measurements are carried out at preferred radio frames, protected or non-protected, once the duration of the time interval has been determined. Hence, the apparatus may further comprise a transmitter operable to transmit the configuration information on the measurement configuration to the mobile transceiver. The transmitter may correspond to any means for transmitting, e.g. a transmitter compliant with one of the above mobile communication systems.

In some embodiments the time interval, at least during an initial configuration, may comprise the at least one of the radio frames in the sequence for which the other base station transceiver is operable to transmit with a reduced transmission power or to suspend transmission, e.g. the at least one ABS, compared to the at least one other radio frame in the sequence, and the time interval comprises the at least one other radio frame, e.g. the at least one non-ABS. That is to say, in some embodiments the time interval comprises or extends throughout two or more radio frames, during at least one of which the transmission power of the other base station transceiver is reduced or transmission is suppressed, e.g. an ABS, and during at least another one of which the transmission power is not reduced by the other base station transceiver.

In some embodiments the controller can be further operable to determine the duration information based on an identification of the mobile transceiver and an associated look-up table. That is to say that the controller may identify the mobile transceiver, e.g. by evaluating a device number, identification from the devices Subscriber Identity Module (SIM), a model number etc. Hence, the duration information may be predetermined in some embodiments and the controller may read said information from a memory or look-up table. Said memory or look-up table can be collocated to the base station transceiver, it can as well be located at another location and the controller may read or retrieve the duration information from there. For example, the interface may be used to communicate with another network entity, which has stored the duration information based on the identification. In further embodiments other ways or mechanisms can be used to determine the duration information, which will be detailed subsequently. In such embodiments the controller can also be operable to write or store a relation between the identification and duration information, such that it can be accessed for later use, which can be by the base station transceiver apparatus itself or by another base station transceiver in the network. For example, the duration information is stored on a model basis, i.e. once the model of a UE has been identified the duration of the time interval or measurement window can be obtained from the look-up table.

The transceiver apparatus may further comprise a receiver operable to receive measurement information on measurement results measured by the mobile transceiver. The receiver may correspond to any means for receiving, e.g. to a receiver for one of the above mentioned mobile communication systems such as an OFDM receiver. The measurement information comprises information on a reception quality of radio signals received by the mobile transceiver from the base station transceiver based on the configuration information. Such measurement result information may, for example, be transmitted from the mobile transceiver to the cell using Radio Resource Control (RRC) signaling, e.g. as part of the 3GPP specifications. The information on the measurement results may comprise further information on a reception quality of radio signals received by the mobile transceiver from the base station transceiver based on the configuration information.

Hence, after the apparatus provided the configuration information according to the above description to the mobile transceiver, the mobile transceiver may return information on the according measurement result. The measurement can be carried out based on reference signals, pilot signals, or other radio signals transmitted by the base station transceiver, e.g. in terms of a Reference Signal Strength Indicator (RSSI), a Reference Signal Receive Power (RSRP), Channel Quality Information (CQI), a Signal-to-Noise-Ratio (SNR), a Signal-to-Interference-and-Noise-Ratio (SINR), a Signal-to-Interference-Ratio (SIR), a Bit-Error-Ratio (BER), a Frame-Error-Ratio (FER), a block-error-rate, etc.

The configuration information may comprise information positioning the time interval to a certain position in the sequence. Hence, although the base station transceiver apparatus may not know the window length or beginning, it may configure a reporting time for the measurement information as part of the configuration information. The cell apparatus may then assume that the actual time interval may end shortly before the configured reporting time, such as 1, 2, 3, 4, 5, 6, 7, etc. radio frames before. By shifting the reporting time and therewith the time interval in the sequence, other parts of the sequence are covered by the time interval and reflected in the measurement information. In other embodiments, the position in sequence may be kept constant while the sequence itself is varied and the variations can be observed in the measurement information. Some embodiments make use of overlapping the time interval with a series of subsequent radio frames, during which the other base station transceiver uses the same transmission characteristic (e.g. ABS, non-ABS). By setting the reporting time to the end of the series and extending the series until the measurement results become mainly stable, the length or duration of the time interval can be determined. This can be achieved by varying the time interval's relative position in the sequence, when the sequence has series or subseries of radio frames with equal characteristics, by varying the sequence accordingly, or by varying both.

In some embodiments the controller can be operable to determine updated sequence information based on the measurement information. The interface can be further operable to provide updated sequence information to the other base station transceiver and the controller can be operable to determine the duration information based on the updated sequence information and the measurement information. Hence, the updated sequence information can be used to vary the sequence in order to determine the duration of the time interval. The controller can be operable to determine the updated sequence information such that a number of subsequent equal radio frames (e.g. ABS or non-ABS) in the sequence during the time interval increases. In some embodiments the other base station transceiver is operable to transmit with the reduced transmission power or to suspend transmission (e.g. ABS) compared to the at least one other of the radio frames in the sequence during all of the subsequent equal radio frames. In some embodiments the other base station transceiver is operable to transmit with the regular transmission power (e.g. non-ABS) during all of the subsequent equal radio frames. Hence, in some embodiments the updated sequence information can be used to configure longer and longer subsequences in the sequence of equal radio frames, e.g. starting from a sequence with alternating radio frames.

From the measurement information the controller may determine changes in the measurements results and once the variation in the measurement results are below a certain threshold, the duration of the time interval and a respective reporting delay can be determined. Hence the controller can be operable to determine the duration information based on changes in measurement information for the updated sequences.

In further embodiments, the controller can be operable to determine the duration information based on different measurement configuration, i.e. by modifying the position of the time interval in a given sequence. The controller can be operable to determine the duration information based on two or more measurement configurations. The two or more measurement configurations may position the time interval to different positions within the sequence. That is to say that although the controller may not be aware of the exact duration of the time interval and a potential delay between the end of the time interval and the time of reporting of information on the measurement results by the mobile transceiver, the controller can change the position of the time interval relative to the sequence. Thereby the controller may shift the time interval in the sequence towards a subsequence of equal radio frames, similar to what was described above. The controller can be operable to determine the duration information based on changes in measurement information for the two or more measurement configurations.

The controller can be operable to determine the duration information based on subsequent measurement configurations. The controller can be further operable to determine the subsequent measurement configurations such that a number of subsequent equal radio frames of the sequence are measured. Again during all of the subsequent equal radio frames the other base station transceiver may be operable to transmit with the reduced transmission power or to suspend transmission (e.g. ABS) compared to the at least one other of the radio frames in the sequence. Or during all of the subsequent equal radio frames the other base station transceiver can be operable to transmit with the regular transmission power (non-ABS), similar to what was described above.

In further embodiments the controller can be operable to determine the configuration information comprising information on a reference radio frame in the sequence. The reference radio frame positions the time interval for the measurements relative to the sequence. In other words, the sequence is comprised of a number of subsequent radio frames. The time interval for the measurements extends over one or more radio frames in the sequence. The position of the time interval within the sequence can in some embodiments be given by a reference radio frame in the sequence, e.g. the beginning, the end, the center or any other point of the time interval is aligned in the sequence. Therewith, embodiments can provide the advantage that the position of the time interval can be set within the sequence, even without having knowledge of the exact duration of the time interval. For example, the beginning or the end of the time interval can be fixed to a certain position or a certain radio frame within the sequence.

For example, in LTE Rel. 10, the maximum ABS period may be 40 sub-frames, because this may be the maximum length of the ABS pattern. Therefore measurement periods of 40 sub-frames and multiples of 40 sub-frames may always be applied to Rel. 8/9 mobiles in an embodiment. However, the other base station transceiver, e.g. a surrounding macro eNB or a CSG, may also apply ABS patterns with a shorter ABS period, e.g. 2, 4, 5, 8, 10, or 20 sub-frames. ABS pattern with a shorter ABS period may be used to enable more frequent measurements of the Rel. 8/9 mobiles in embodiments. E.g. if the ABS period is 2 sub-frames, the possible measurement or reporting periods for Rel. 8/9 mobiles inside the interfered cells are 2, 4, 6, . . . sub-frames, which can be configured as part of the measurement configuration information. In some embodiments the base station transceiver apparatus, e.g. a small/pico cell or a cell interfered by a CSG cell, may determine the shortest possible measurement period and, if applicable, it may configure a Rel. 8/9 mobile to the optimal measurement period.

In embodiments the controller can be operable to determine the configuration information comprising information on a measurement repetition cycle corresponding to an integer multiple of a repetition cycle of the sequence. That is to say, the repetition cycle of the measurements can be adapted to the repetition cycle of the sequence. Hence, in embodiments measurements may be carried out in every, or every second, third, fourth, etc. sequence. However, in line with the above, at least two subsequent measurements would still be carried out at the same position, in every, or every second, third, fourth, etc. sequence. Embodiments may therefore provide the advantage that measurements would be reliably taken at the same position within the sequence, and measurements could be taken on a more coarse time scale than the repetition cycle of the sequence. Moreover, repetition cycles can be optimized jointly and therewith adapted to the respective needs in the HetNet.

The controller may be further operable to schedule a data transmission from the base station transceiver to the mobile transceiver during a radio frame for which the other base station transceiver is operable to transmit with the reduced transmission power or to suspend transmission, e.g. during an ABS, or during a radio frame for which the other base station transceiver is operable to transmit with regular transmission power, e.g. a non-ABS, based on the information on the measurement results. Hence, the measurement results may be used to find a scheduling decision, i.e. to find radio resources, in terms of time, frequency, code, or spatial resources, to allocate to the mobile transceiver for payload data transmission. The measurement results may then be advantageously exploited in order to decide when to schedule the mobile transceiver, e.g. during an ABS or a non-ABS.

Furthermore, the controller can be further operable to determine a corrected information on a measurement result based on the information on the at least one of the radio frames in the sequence, during which the other base station transceiver is operable to transmit with the reduced transmission power or to suspend transmission, e.g. an ABS, compared to the at least one other of the radio frames in the sequence, e.g. a non-ABS, and based on the configuration information. In other words, the controller may be enabled to correct the measurement result based on the knowledge about the sequence of the other base station transceiver and based on the information on the measurement results.

The corrected measurement information may comprise information on a signal quality of the signals transmitted by the base station transceiver and received by the mobile transceiver for radio frames, during which the other base station transceiver is operable to transmit with the reduced transmission power or to suspend transmission, e.g. ABSs. That is to say that the controller may be enabled to correct the measurement results towards measurement results that could only be obtained during ABSs based on the knowledge of the window position and duration in the sequence and the sequence itself. In a similar way, the corrected measurement information may comprise information on a signal quality of the signals transmitted by the base station transceiver and received by the mobile transceiver for radio frames, during which the other base station transceiver is operable to transmit with the regular transmission power, e.g. during non-ABSs. That is to say that the controller may be enabled to correct the measurement result towards a measurement result that could only be obtained during non-ABSs based on the knowledge of the window position and duration in the sequence and the sequence itself.

In some embodiments the controller can be further operable to schedule a data transmission from the base station transceiver to the mobile transceiver during a radio frame for which the other base station transceiver is operable to transmit with the reduced transmission power or to suspend transmission, e.g. an ABS, when the information on the corrected measurement results indicates a signal quality of the radio signals received at the mobile transceiver, which is below a threshold. In other words the controller may use the information on the measurement result to determine whether a data transmission to the mobile transceiver is scheduled in a regular radio frame or a frame with reduced transmission power. The decision may be determined based on a threshold comparison.

For example, the corrected information on the measurement result may indicate a channel quality, e.g. in terms of a CQI, which is compared to the threshold. In other embodiments a UE specific threshold may be determined based on the non-corrected measurement result. Hence a common threshold may be used when the corrected measurement results are used, and UE-specific thresholds may be used when non-corrected or original measurement results are used. Note that such measurement may result from ABS, non-ABS or both. When the channel quality indication lies below the threshold, then the controller may be operable to decide to schedule a data transmission in a radio frame, in which the transmission power of the other base station transceiver is reduced or the transmission is suspended. That way, the mobile transceiver may experience reduced interference from the other base station transceiver during that radio frame. In a similar way, the controller can be operable to schedule the mobile transceiver for payload data transmission during a radio frame for which the other base station transceiver is operable to transmit with regular transmission power, when the corrected information on the measurement results indicates a signal quality of the radio signals received at the mobile transceiver, which is above the threshold. Hence, when the information on the measurement results indicates a better channel quality, e.g. in terms of a CQI indication lying above the threshold, the controller may be operable to schedule the mobile transceiver in a radio frame during which the other base station transceiver uses regular transmission power. Since the channel quality is not as severe as in the above case, the mobile transceiver may not experience as severe interference by the other base station transceiver. The differences in the channel qualities of different mobile transceivers can be due to different radio channel conditions to the base station transceiver and the other or interfering base station transceiver, e.g. because the different mobile transceivers may be located at the border of the coverage of a small cell or at the center of a small cell, close to or even in a CSG cell or farther away from the CSG cell.

The controller may further be operable to determine the corrected information on the measurement result based on an error rate of payload data transmissions from the base station transceiver to the mobile transceiver in radio frames, during which the other base station transceiver is operable to transmit with the reduced transmission power or to suspend transmission, and/or in radio frames, during which the other base station transceiver is operable to transmit with the regular transmission power. That is to say that the controller may take into account or learn from payload transmissions during certain radio frames to the mobile transceiver. For example, the error rate, e.g. in terms of a BER or a block error rate, may be determined and the controller may take said error rate into account, when deciding which radio frame, e.g. ABS or non-ABS, to use for a payload transmission to a UE. Another threshold can be used to compare said error rate to and similar to the above, if the error rate is higher than the threshold radio frames with reduced transmission power or suspended transmission of the other base station transceiver may be used, because of the improved interference condition of the mobile transceiver during these radio frames and the lower error rate to be expected.

The controller may be further operable to determine the corrected information on the measurement result based on an analysis of acknowledgements for payload data packets transmitted in radio frames, during which the other base station transceiver is operable to transmit with the reduced transmission power or to suspend transmission, and/or in radio frames, during which the other base station transceiver is operable to transmit with the regular transmission power. For example, retransmissions may take place when a payload data transmission does not succeed on the first attempt. The controller can be operable to determine the number of retransmissions carried out for a successful transmission of a payload data packet and then base the decision on which radio frame to use for a payload data transmission to the mobile transceiver based on said number of retransmission attempts. Again a threshold decision can be used.

The controller can be operable to determine the configuration information, such that the time interval, having a predetermined duration, comprises as many radio frames, during which the other base station transceiver is operable to transmit with the reduced transmission power or to suspend transmission, as possible. That is to say the controller may optimize the measurement, e.g. by positioning the time interval in the sequence, such that the measurement refers to radio frames with reduced transmission power, e.g. ABS, of the other base station as much as possible. For example, the time interval can be positioned in the sequence so as to comprise as many ABSs as possible. In a similar way the controller can be operable to determine the configuration information, such that the time interval, having a predetermined duration, comprises as few radio frames, during which the other base station transceiver is operable to transmit with the reduced transmission power or to suspend transmission, as possible. For example, the time interval can be positioned in the sequence so as to comprise as few ABSs as possible, as many non-ABSs as possible, respectively.

In further embodiments the controller can be operable to schedule a data transmission from the base station transceiver to the mobile transceiver based on information on handover measurements from the mobile transceiver. That is to say, handover measurements, which are carried out by the mobile transceiver, can be taken into account for the scheduling as well. These measurements may provide a relative signal quality measure of the cell and the other cell, such that they can be used to determine, whether the mobile transceiver could be close to a handover to another cell. For example, the controller can be operable to determine whether the mobile transceiver receives radio signals from the other base station transceiver with a signal strength above a threshold. The threshold can be defined based on the own or serving cell receive signal strength. In some embodiments an absolute threshold can be used. In some embodiments the mobile may measure the relative difference between the signal strengths of own and other cell. In some embodiments the mobile transceiver may then be categorized whether it is rather at the cell center of the small cell, i.e. the signals received from the small cell base station transceiver are stronger than the signals from the other base station transceiver, or whether the mobile transceiver is located at the cell border, where the signals may be received at about the same strength. Accordingly, in embodiments the mobile transceiver may then be categorized whether it is close to a CSG cell or distanced from a CSG cell, i.e. the signals received from the base station transceiver are stronger than the signals from the other CSG base station transceiver.

Moreover, when the radio signals from the other base station transceiver are received with a signal strength above the threshold, the controller can be further operable to determine the configuration information such that the mobile transceiver performs measurements during more radio frames during which the other base station transceiver is operable to transmit with the reduced transmission power or to suspend transmission, e.g. ABSs, than in radio frames, during which the other base station transceiver is operable to transmit with the regular transmission power. In other words, the controller may be operable to configure the measurements such that they focus on the type of radio frames payload transmissions are scheduled in.

Embodiments further provide a method for a base station transceiver for a mobile communication system. The base station transceiver is operable in a coverage area of another base station transceiver. The other base station transceiver is operable to transmit radio signals in a repetitive sequence of radio frames, wherein in at least one of the radio frames in the sequence the other base station transceiver is operable to transmit with a reduced transmission power or to suspend transmission compared to at least one other of the radio frames in the sequence. The method comprises receiving sequence information on the at least one of the radio frames in the sequence, during which the other base station transceiver is operable to transmit with the reduced transmission power or to suspend transmission compared to the at least one other of the radio frames in the sequence. The method further comprises determining configuration information on a measurement configuration for a mobile transceiver associated to the base station transceiver, wherein the configuration information comprises information on a signal quality measurement at the mobile transceiver on radio signals received from the base station transceiver. The signal quality measurement is performed during a time interval with a duration being predetermined by the mobile transceiver. The method further comprises determining duration information on the duration of the time interval and determining the configuration information based on the sequence information and the duration information.

Embodiments may further provide a computer program having a program code for performing one of the methods described above, when the computer program is executed on a computer or a processor. Some embodiments comprise a digital control circuit installed within the apparatus for performing the method. Such a digital control circuit, e.g. a Digital Signal Processor (DSP), needs to be programmed accordingly. Hence, yet further embodiments also provide a computer program having a program code for performing embodiments of the method, when the computer program is executed on a computer or a digital processor.

For example, embodiments may therewith provide the advantage that by determining the duration of the measurement period of Rel. 8/9 mobiles in the ABS period of the ABS pattern (or multiples of it), improved measurements may be obtained, which can be directed or at least focused on ABS or non-ABS pattern. Moreover, each reported CQI may consider the interference during ABS and non-ABS phases always with the same weighting. Moreover, based on this stable measurement value, the cell or eNB may correct the CQI value towards a more aggressive CQI, when scheduling a mobile during macro ABS, and towards a more conservative CQI when scheduling the mobile during macro non-ABS. Such corrections may be carried out on the basis of a Block Error Rate analysis, e.g. monitoring ACK/NACK for payload transmissions. Due to the restriction of the measurement period to the ABS period of the ABS pattern, the DL CQI measurement for each Rel. 8/9 mobile may also be stable if different mobiles apply different schemes for the CQI determination, e.g. different filter schemes for interference measurement.

Embodiments may provide the advantage that, for example, LTE Rel. 8 mobiles are enabled to take benefit from biased HetNets and eICIC.

BRIEF DESCRIPTION OF THE FIGURES

Some embodiments of apparatuses and/or methods will be described in the following by way of example only, and with reference to the accompanying figures, in which.

DESCRIPTION OF EMBODIMENTS

Various example embodiments will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
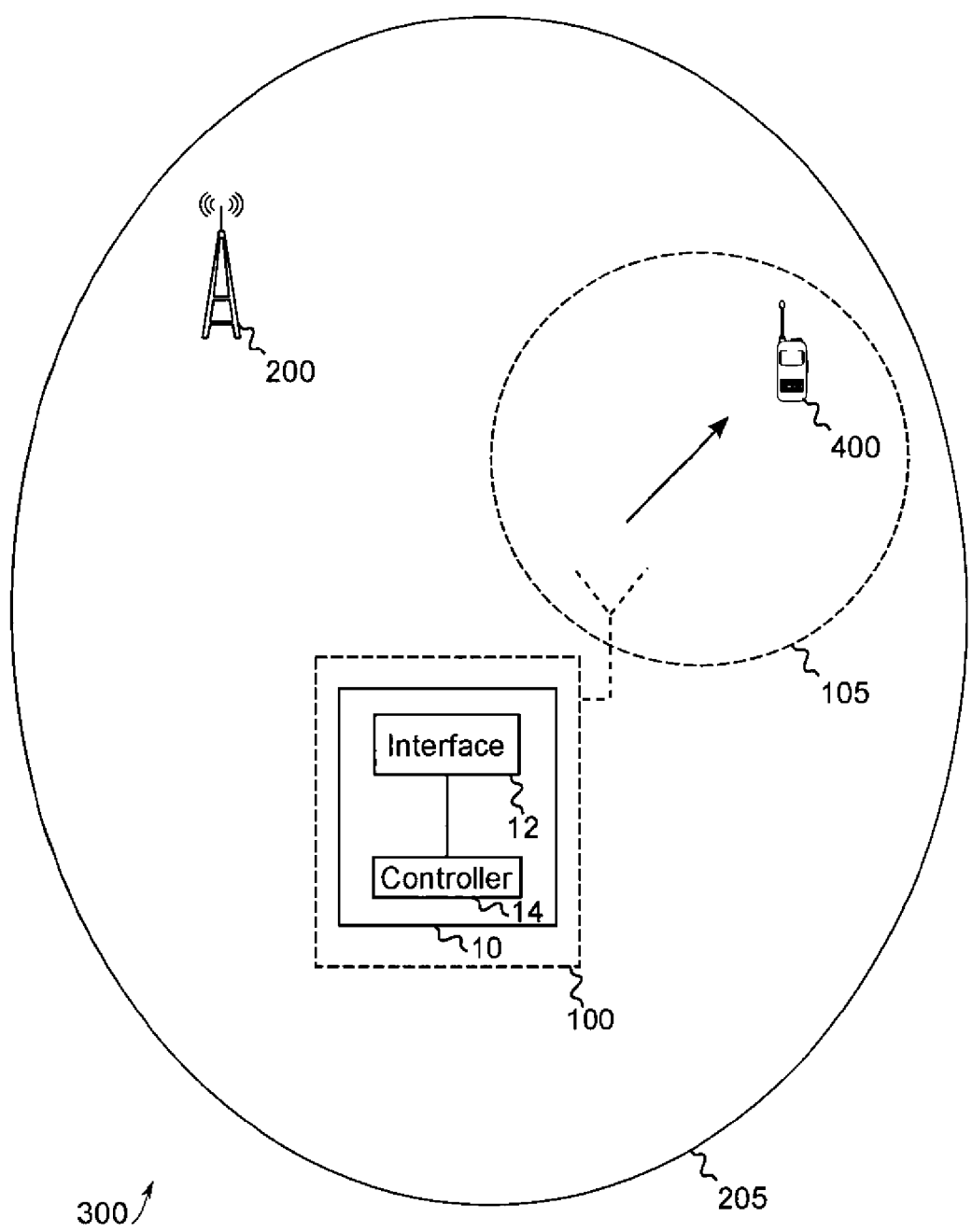
FIG. 1 shows a block diagram of an embodiment of a base station transceiver apparatus.

FIG. 1 shows an embodiment of an apparatus 10 for a base station transceiver 100 for a mobile communication system 300. The mobile communication system 300 can be assumed to be an LTE system in the present embodiment. The base station transceiver 100, which corresponds to a small cell base station transceiver 100 in the present embodiment, is shown with a broken line indicating that the small cell base station transceiver 100 itself can be optional, comprises the apparatus 10. The coverage area 105 of the small cell 100 is also depicted in FIG. 1. The small cell base station transceiver 100 is operable in a coverage area 205 of another base station transceiver 200, which can be assumed to be a macro base station transceiver 200 in the present embodiment. The other base station transceiver 200 is operable to transmit radio signals in a repetitive sequence of radio frames, which will be detailed subsequently. In at least one of the radio frames, e.g. an ABS, in the sequence the other base station transceiver 200 is operable to transmit with a reduced transmission power or to suspend transmission compared to at least one other of the radio frames, e.g. a non-ABS, in the sequence.

As shown in FIG. 1, the apparatus 10 comprises an interface 12 operable to receive sequence information on the at least one of the radio frames in the sequence, during which the other base station transceiver 200 is operable to transmit with the reduced transmission power or to suspend transmission (ABS) compared to the at least one other of the radio frames in the sequence (non-ABS). In the present embodiment it can be assumed that the interface 12 corresponds to an X2 interface between the apparatus 10 at the small cell base station transceiver 100 and the macro base station transceiver 200. The apparatus 10 further comprises a controller 14, which is coupled to the interface 12. The controller 14 is operable to determine configuration information on a measurement configuration for a mobile transceiver 400 associated to the small cell base station transceiver 100 based on the received information. The configuration information comprises information on a signal quality measurement at the mobile transceiver 400 on radio signals received from the small cell base station transceiver 100. The signal quality measurement is performed during a time interval with a duration being predetermined by the mobile transceiver 400. The controller 14 is further operable to determine duration information on the duration of the time interval and the controller 14 is operable to determine the information on the measurement based on the sequence information and the duration information.

Moreover, the apparatus 10 comprises a receiver operable to receive measurement information on measurement results measured by the mobile transceiver 400. The measurement information comprises information on a reception quality of radio signals received by the mobile transceiver 400 from the small cell base station transceiver 100 based on the configuration information. The measurements carried out by the UE 400 are CQI measurements and the CQI reporting is carried out as part of the measurement information.

Figure 2:
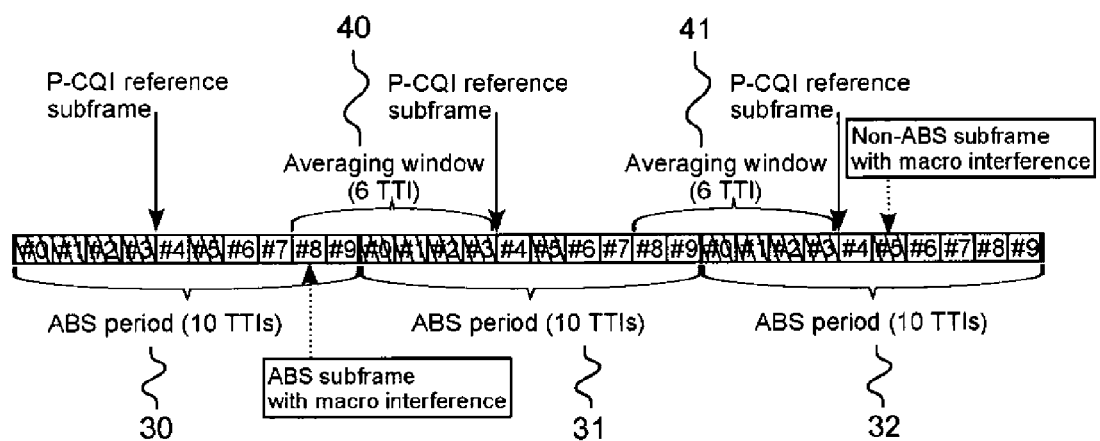
FIG. 2 illustrates an interference situation of a small cell base station transceiver.

In the following embodiment the small cell 100, with coverage area 105, is assumed to be a pico cell 100. FIG. 2 illustrates an interference situation from point of view of the pico cell 100. In this embodiment the sequence corresponds to an ABS period of 10 Time Transmission Intervals (TTIs), three of which are shown in FIG. 2. In other words FIG. 2 shows three subsequent sequences 30, 31, and 32. Moreover, in this embodiment a TTI corresponds to 1 ms, the basic ABS period or sequence duration of the surrounding macro cell 200, with coverage area 205, is 10 ms. Hence, a radio frame, during which the other base station transceiver 200 (macro cell) is operable to transmit with the reduced transmission power or to suspend transmission (ABS indicated by blank TTIs in FIG. 2)) compared to the at least one other of the radio frames in the sequence (non-ABS, indicated by hachured TTIs in FIG. 2), corresponds in this embodiment to a TTI. In the present embodiment 10 subsequent TTIs form the repetitive sequence 30, 31, 32.

FIG. 2 shall illustrate an embodiment, in which an LTE Rel. 8/9 mobile 400 measures CQI based on a Periodic CQI measurement (P-CQI). Hence the measurement configuration corresponds to a P-CQI. The configuration information comprises information positioning the time interval to a certain position in the sequence. The time interval during which the mobile 400 carries out the measurement is also referred to as averaging window 40, 41, two of which are shown in FIG. 2. That is to say the mobile 400 averages or filters measurements across 6 subsequent TTIs or radio frames. The pico eNB 100 configures the Rel. 8/9 mobile 400 to measure always the same sub-frames or time interval 40, 41 inside the (shortest) ABS period 30, 31, 32 of the surrounding macro cell 200, i.e. 10 sub-frames in the embodiment illustrated in FIG. 2. In general the averaging characteristic, e.g. exponential or sliding window, may be unknown to the small cell 100. In the embodiment, a sliding window of length 6 sub-frames or TTIs is assumed but the information regarding the window length is unknown to the small cell transceiver 100.

Moreover, in the embodiment depicted in FIG. 2, the controller 14 is operable to determine the configuration information comprising information on a measurement repetition cycle corresponding to an integer multiple of a repetition cycle of the sequence 30, 31, 32, where the measurement repetition cycle corresponds to one. In other words, as shown in FIG. 2 the measurement repeats in every sequence and even overlaps sequences. The measurement extends from radio frames 8, 9 of sequence 30 to radio frames 0, 1, 2, 3 in sequence 31, from radio frames 8, 9 of sequence 31 to radio frames 0, 1, 2, 3 in sequence 32, etc.

In the present embodiment the controller 14 is operable to determine the configuration information comprising information on a reference radio frame, to which it is also referred to as P-CQI reference sub-frame in FIG. 2, in the sequence 30, 31, 32, the reference radio frame positions the time interval for the measurements relative to the sequence 30, 31, 32. It is to be noted that the reporting delay, i.e. a time between the end of the time interval and the actual reporting, is assumed to be zero in the present embodiment. Generally, this delay may vary between different mobile transceivers but it may be considered constant per UE.

In an embodiment the controller 14 is further operable to determine the duration information based on an identification of the mobile transceiver 400 and an associated look-up table. The identification of the mobile 400, e.g. a model number, can be derived from a unique identification the mobile 400 uses in the network, such as the International Mobile Subscriber Identity (IMSI), the International Mobile Equipment Identity (IMEI), the Temporary Mobile Subscriber Number (TMSI), etc. Any identification of the mobile transceiver may serve as entry into a look-up table for determination of the corresponding duration information. Coming back to the situation depicted in FIG. 2 the duration information may indicate 6 TTIs. Based on this information the controller can adjust the position (reference frame) using the configuration information as it is depicted in FIG. 3.

Figure 3:
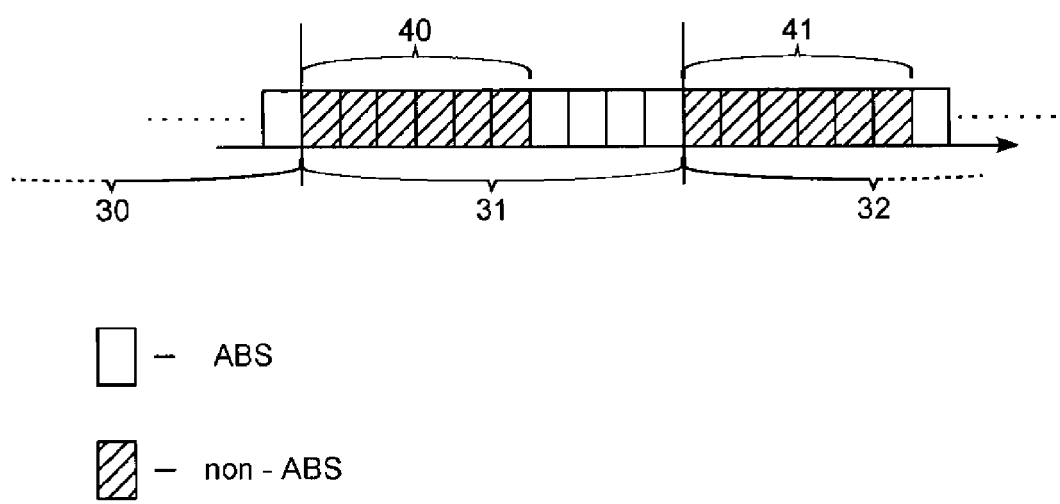
FIG. 3 depicts a sequence adjustment in an embodiment.

FIG. 3 depicts three subsequent sequences 30, 31, 32, as they have already been depicted in FIG. 2. Each of the sequences 30, 31, 32 comprises 10 subsequent TTIs. ABSs are depicted as blank radio frames or sub-frames; non-ABSs are shown as hachured radio frames. Moreover, two subsequent time intervals or averaging windows 40 and 41 are shown, which, as compared to FIG. 2 have been adjusted to span the sub-sequence of 6 consecutive non-ABS frames. Hence, based on the duration information the controller 14 can position the time interval to overlap with non-ABS only. As the controller now knows the outcome of a pure non-ABSs measurement, it may also determine a corrected measurement for a pure ABSs measurement as will be detailed in the sequel.

Figure 4:
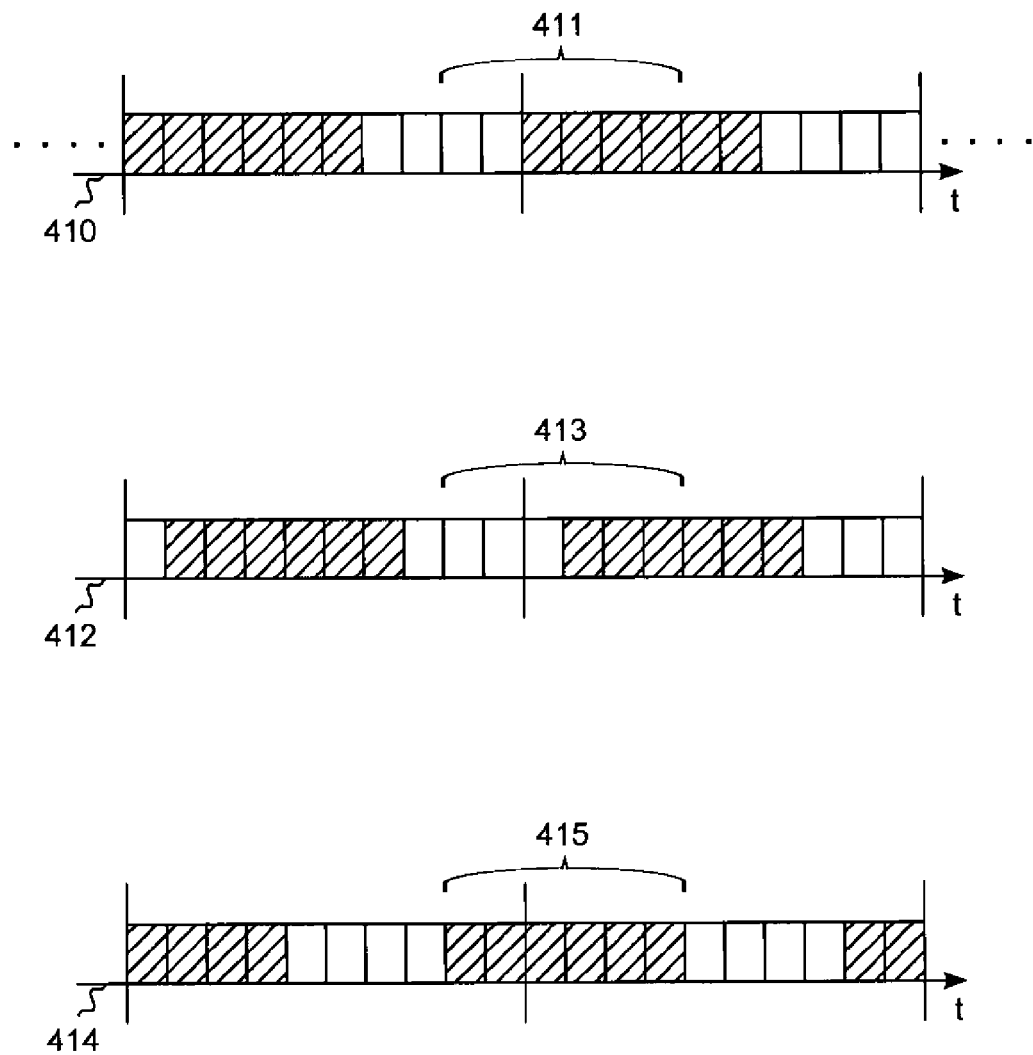
FIG. 4 depicts a sequence adjustment in another embodiment.

In an embodiment the controller 14 is operable to determine updated sequence information based on the measurement information. The interface 12, i.e. X2, is further operable to provide updated sequence information to the other base station transceiver 200. The controller 14 is operable to determine the duration information based on the updated sequence information and the measurement information. This embodiment is depicted in FIG. 4. FIG. 4 shows three variations of sequences 410, 412, and 414 with three time intervals 411, 413, and 415, which are positioned according to FIG. 2. As can be seen in FIG. 4 the variations of the sequences 410, 412 and 414 lead to different CQI measurement results. The more ABSs fall into the time interval, the better the CQI, due to the better interference conditions.

In the present embodiment, the resulting weighting of ABS (blank radio frames in FIGS. 2, 3, 4) and non-ABS (hachured radio frames in FIG. 2, 3, 4) for sequence 410 in FIG. 4 leads to an SINR measurement value of:

$$SINR_{CQI} = \frac{S}{w_{ABS} \cdot I_{ABS} + w_{NonABS} \cdot I_{NonABS} + N} = \frac{S}{\frac{2}{6}I_{ABS} + \frac{4}{6}I_{NonABS} + N},$$

wherein S determines the signal power received from the small cell 100, $I_{ABS}$ and $w_{ABS}$ refer to the interference power and weight in an ABS received from the macro cell 200, $I_{NonABS}$ and $w_{NonABS}$ refer to the interference power and weight in a non-ABS received from the macro cell 200, and N refers to thermal noise power. It may be noted that the weighting may not be known to the pico cell eNB 200.

Hence the measurement information may indicate $SINR_{CQI}$ to the controller 14. The controller 14 would then determine that the SINR is lowest for sequence 414 and hence this value may correspond to the pure non-ABS measurement result. The Figs. are to be considered exemplary, when the duration of the time interval is larger, e.g. 20 TTIs, then the above concept would have to be adapted accordingly, e.g. using a sequence with 20 radio frames, which can be successively filled with ABSs or non-ABSs, respectively.

Figure 5:
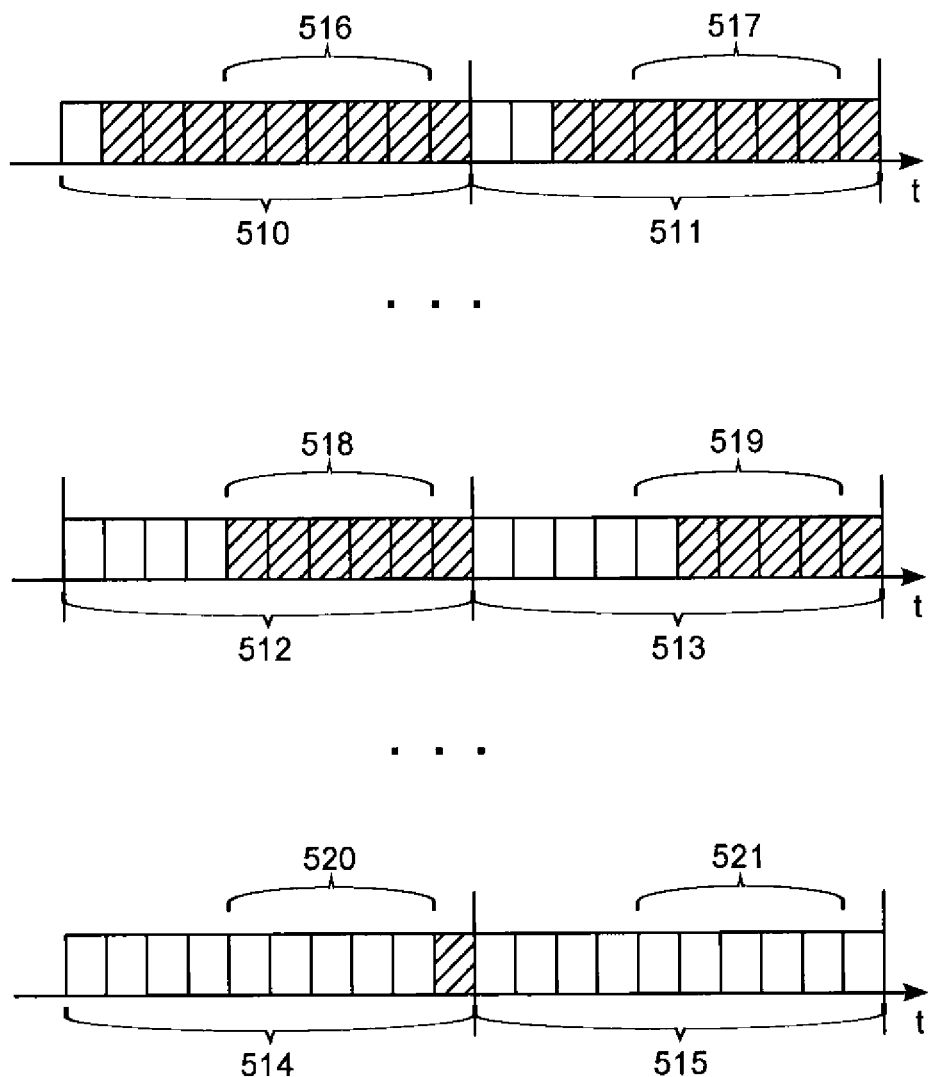
FIG. 5 depicts a sequence adjustment in yet another embodiment.

In further embodiments the controller 14 is operable to determine the updated sequence information such that a number of subsequent equal radio frames (ABS or non-ABS) in the sequence during the time interval increases. For example, during all of the subsequent equal radio frames the other base station transceiver 200 is operable to transmit with the reduced transmission power or to suspend transmission compared to the at least one other of the radio frames in the sequence. Such a situation is depicted in FIG. 5. The configuration information comprises information on a periodic signal quality measurement at the mobile transceiver 400 on radio signals received from the small cell base station transceiver 100 during a time interval. The configuration information comprises information positioning the time interval 516, 517, 518, 519, 520 and 521 in the sequence to the same position for at least two subsequent signal quality measurements.

FIG. 5 shows six variations of sequences 510, 511, 512, 513, 514, 515 together six exemplary time intervals 516, 517, 518, 519, 520, 521 during which SINR measurements are taken by the mobile 400. As can be seen in the sequences consecutive ABSs are added successively. The first two sequences 510, 511 do not take effect on the measurements as their changes do not affect the respective time intervals 516, 517. Some sequences are skipped in the sequel between sequence 511 and 512 indicated by the dots in FIG. 5.

Sequences 512 and 513 illustrate that eventually the added ABS influence the measurement results, as now ABSs begin to fall into the time intervals 518 and 519, hence the interference condition of the mobile 400 improves. Again, some sequences of the iteration are skipped between sequence 519 and 520. Sequences 520 and 521 illustrate that eventually the addition of ABSs would stop influencing the measurements as they would now lie outside the time interval 521 again. Hence, SINRs may remain constant until sequence 513 and then improve before remaining constant after sequence 520. Hence, from the measurement information the controller 14 may be able to determine position and duration of the time interval. The controller 14 is operable to determine the duration information based on changes in measurement information for updated sequences.

It should be noted that FIG. 5 should be considered exemplary in order to provide an easier understanding of embodiments. Sequence 521 having only ABSs, i.e. the macro cell 200 would hardly transmit at all, may not be practical. Hence, sequences may always comprise at least one ABS and at least one non-ABS. In another embodiment the other base station transceiver 200 is operable to transmit with regular transmission power during all of the subsequent equal radio frames. I.e. ABS and non-ABS may switch roles in FIG. 5, hence more and more non-ABS may be added successively to an initial sequence 521.

Figure 6:
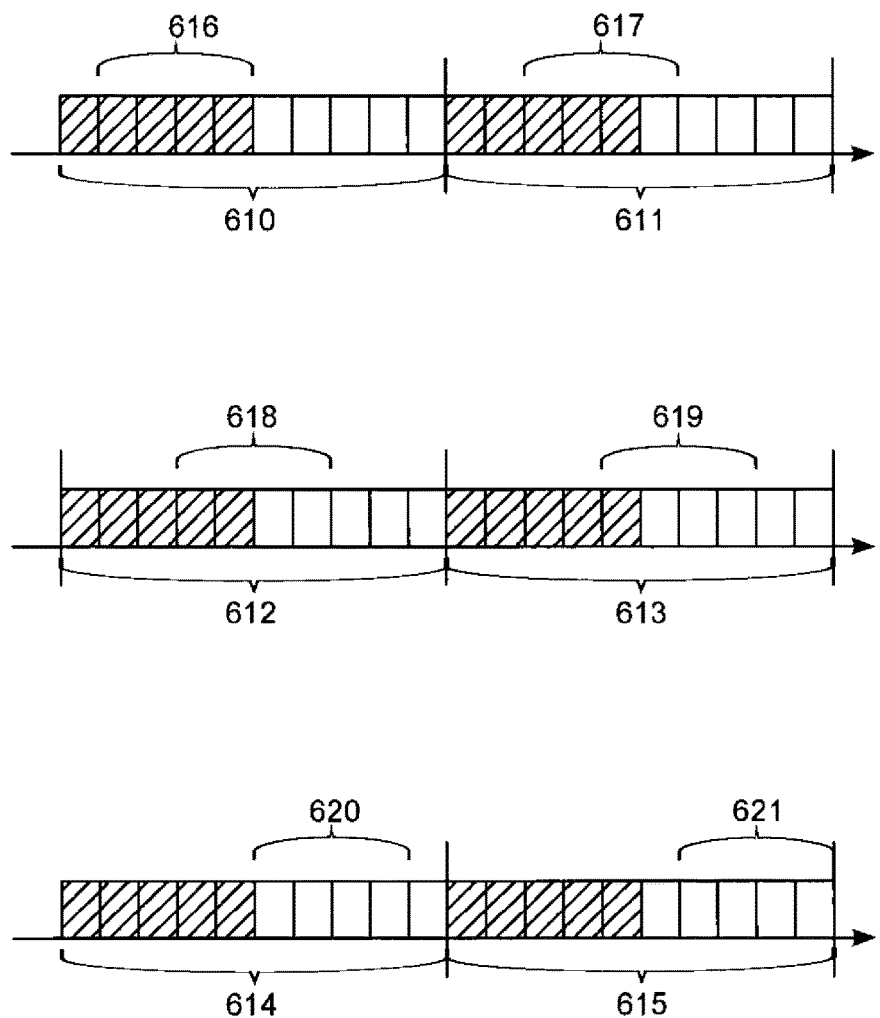
FIG. 6 depicts a time interval adjustment in an embodiment.

In a further embodiment the controller 14 is operable to determine the duration information based on two or more measurement configurations. The two or more measurement configurations position the time interval to different positions within the sequence. Again, similar to the above, the controller 14 is operable to determine the duration information based on changes in measurement information for the two or more measurement configurations. The controller 14 is operable to determine the duration information based on subsequent measurement configurations and the controller 14 is operable to determine the subsequent measurement configurations such that a number of subsequent equal radio frames of the sequence are measured. For example, the other base station transceiver 200 is operable to transmit with the reduced transmission power or to suspend transmission compared to the at least one other of the radio frames in the sequence during all of the subsequent equal radio frames. This example is depicted in FIG. 6. FIG. 6 shows six subsequent sequences 610, 611, 612, 613, 614 and 615, which are repetitions of the same pattern; hence, the sequence configuration remains unchanged.

FIG. 6 further shows a moving time interval 616, 617, 618, 619, 620, 621. As can be seen from FIG. 6 the time interval is moved from a sub-sequence of non-ABS to a sub-sequence of ABS. From the measurement results, the controller 14 can then determine the duration of the time interval and the position of the windows in line with the above. Correspondingly, the time interval could also be moved in the opposite direction as shown in FIG. 6. Hence, the other base station transceiver 200 can be operable to transmit with the regular transmission power (non-ABS) during all of the subsequent equal radio frames to which the time interval is moved.

Figure 7:
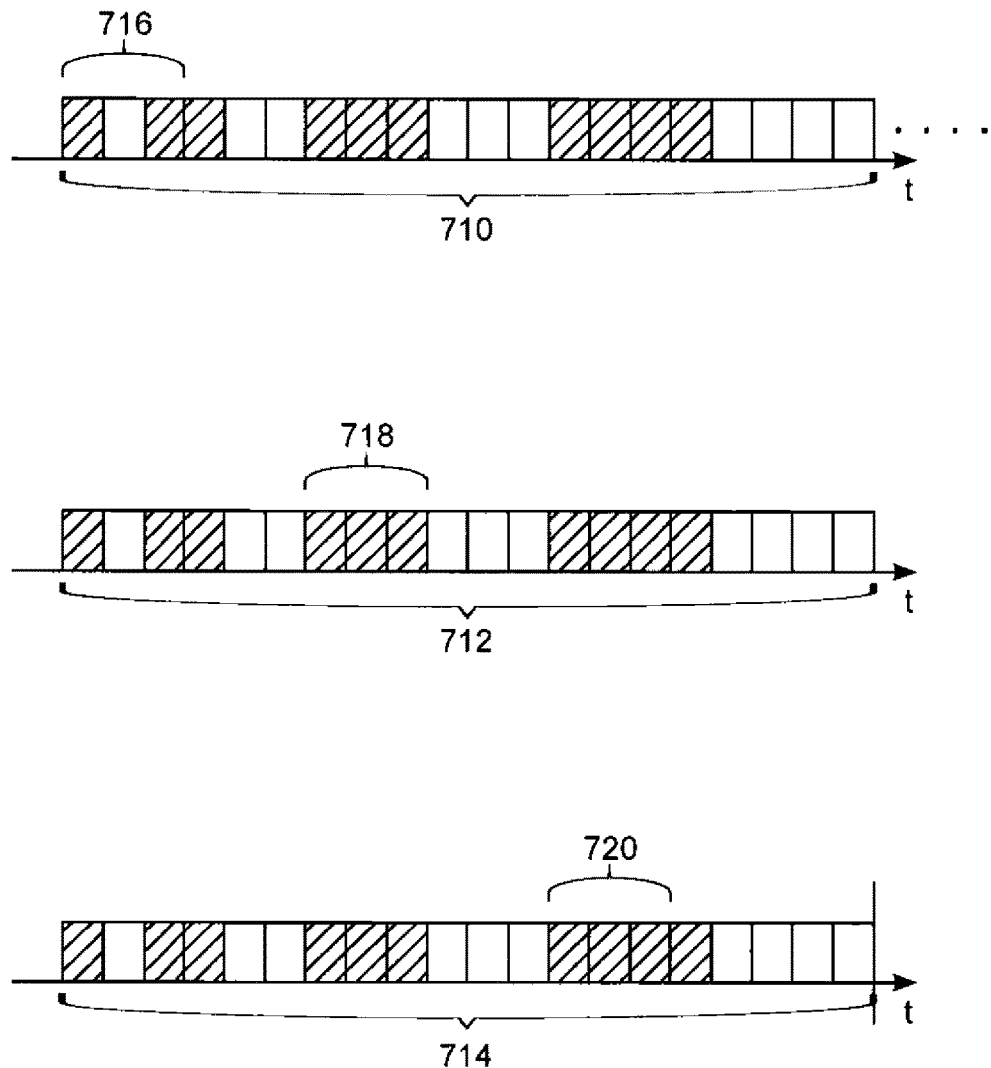
FIG. 7 depicts a time interval adjustment in another embodiment.

From the above embodiments it becomes clear that the controller may easily detect a time interval duration of a single radio frame by moving the time interval relative to the sequence, when the sequence has alternating ABSs and non-ABSs. In embodiments special sequences may be utilized for the purpose of determining the duration information. Such sequences may comprise alternating groups of ABS and non-ABS, where the size of the groups is increased. FIG. 7 illustrates such a sequence 710, one non-ABS is followed by one ABS, then two non-ABSs are followed by two ABSs, then three non-ABSs are followed by three ABSs, etc. This sequence is repeated as indicated by the subsequent repetitions 712 and 714. In this example, the duration of the time interval is determined by configuring the position of the time interval in the sequence and monitoring the changes in the measurement results. The time interval is shifted step by step, radio frame by radio frame, along the sequence, cf. 716, 718, 720. As indicated by time interval 718 in this position the time interval spans 3 non-ABS yielding the worst SINR in the sequence so far. In position 720 the same situation occurs again, however the SINR may not differ, hence, the controller concludes that the minimum has already been achieved before and that the duration is 3TTIs. Moreover, if time interval is shifted one more time to the right, it would still experience three non-ABS in the group of four, which can also be used as indicator that the duration is 3TTIs.

In some embodiments, e.g. if the sequence of FIGS. 2 and 3 would not comprise 6 consecutive equal radio frames (ABS or non-ABS) the time interval (6 TTIs) comprises the at least one of the radio frames in the sequence for which the other base station transceiver 200 is operable to transmit with a reduced transmission power or to suspend transmission (two ABSs per time interval in FIG. 2) compared to the at least one other radio frame in the sequence (four non-ABSs per time interval in FIG. 2), and the time interval comprises the at least one other radio frame. In such embodiments, especially when taking into account the load of the macro cell it may not be possible to configure sequence or time interval such that pure ABS or non-ABS time intervals can be achieved.

Furthermore, in some embodiments the controller 14 is further operable to schedule a data transmission from the pico cell 100 to the mobile 400 during a radio frame for which the macro cell 200 is operable to transmit with the reduced transmission power or to suspend transmission (ABS), or during a radio frame for which the macro cell 200 is operable to transmit with regular transmission power (non-ABS), based on the information on the measurement results. Hence based on the measurement results, the scheduler at the pico cell 100 decides to schedule the mobile 400 either in ABS or non-ABS.

The controller 14 may determine a corrected information on a measurement result based on the information on the at least one of the radio frames in the sequence, during which the macro cell 200 transmits with the reduced transmission power or to suspend transmission (ABS) compared to the at least one other of the radio frames (non-ABS) in the sequence, and based on the configuration information. The pico cell 100 knows the measurement configuration and the ABS period and pattern. Hence, measurement results may be corrected accordingly. The corrected measurement information may comprise information on a signal quality of the signals transmitted by the macro cell 200 and received by the mobile 400 for ABS or non-ABS.

The pico cell 100 may apply two Block Error Rate (BLER) loops, in order to correct the signaled CQI value towards aggressive and conservative in case of protected (ABS) and non-protected resources (non-ABS), respectively. Hence, the controller 14 may be further operable to determine the corrected information on the measurement result based on an error rate of payload data transmissions from the pico cell 100 to the mobile 400 in ABS and non-ABS. Furthermore, a BLER loop may analyze ACKnowledgements (ACKs) and Negative ACKs (NACKs) in order to calculate two correction values, which can be specific for every mobile and for protected and non-protected resources. Hence, the controller 14 may be further operable to determine the corrected information on the measurement result based on an analysis of acknowledgements for payload data packets transmitted in ABS and non-ABS.

In the embodiment shown in FIG. 2, the pico cell or eNB 100 signals the P-CQI reference sub-frame as part of the measurement configuration to the Rel. 8/9 mobile 400. The measurement period or time interval 40, 41 is adapted to the ABS period 30, 31, 32 or a multiple of the ABS period of the surrounding macro cell 200. If the ABS period changes, e.g. due to an adaptation of the ABS pattern, new P-CQI reference sub-frames can be signaled to the Rel. 8/9 mobile 400 as part of the measurement configuration information.

In some embodiments, preferably macro ABS patterns with short periods can be chosen in order to allow a higher flexibility for the CQI measurement periods of Rel. 8/9 mobiles 400 attached to pico cells 200. Hence in embodiments the controller 14 may be operable to determine the configuration information, such that the time interval, having a predetermined duration, comprises as many ABS or non-ABS as possible. Hence the time interval 40, 41 can be shifted within the sequence 30, 31, 32 in order to improve or even optimized the number of ABS or non-ABS in the window 40, 41, cf. FIGS. 2 to 7. In an embodiment the pico base station transceiver 100 may configure the mobile's 400 CQI measurement so that the weighting of ABS or non-ABS is as high as possible. In FIG. 2, the weighting of interference caused by non-ABS is high, because the measurement is finished directly after P-CQI reference sub-frame #3, i.e. directly after the largest block of macro non-ABS. According to this consideration, the best reference sub-frame for a measurement that optimizes the weighting for ABS interference is sub-frame #9, because it is preceded by the longest sequence of ABS within the sequence 30, 31, 32.

In some embodiments the controller 14 is further operable to schedule a data transmission from the pico cell 100 to the mobile 400 during an ABS, when the information on the corrected measurement results indicates a signal quality of the radio signals received at the mobile 400, which is below a threshold; during a non-ABS when the information on the measurement results indicates a signal quality of the radio signals received at the mobile 400, which is above the threshold, respectively.

Figure 8:
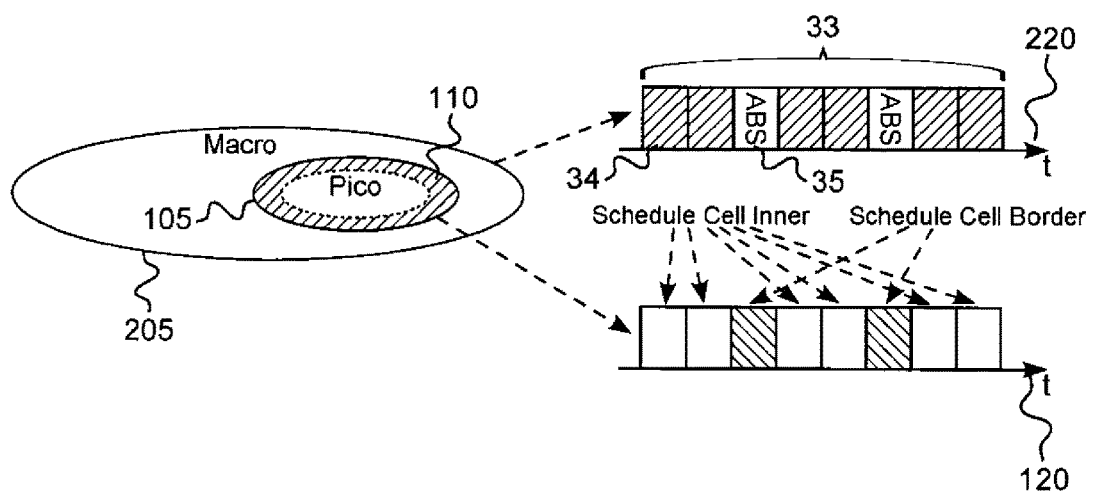
FIG. 8 depicts a HetNet scenario with an embodiment.

In order to decide when to schedule a mobile 400, i.e. to decide if a mobile 400 is scheduled during protected (ABS) or non-protected resource (Non-ABS), it may be helpful to know if a mobile is located at the cell center or at the cell border of the pico cell 100, which shall be further illustrated by FIG. 8.

FIG. 8 depicts a HetNet scenario with an embodiment of a small cell as a pico cell 100 for which the coverage 105 is shown with its cell border area 110. The pico cell is surrounded by the macro cell 200 with the macro cell coverage area 205. Moreover, FIG. 8 illustrates the ABS pattern or sequence 33 of the macro cell on a time line 220, which is subdivided in radio frames. The sequence 33 comprises non-ABS 34 (hachured radio frames) and ABS 35 (blank radio frames), for each of which only a single one has a reference sign. Another time line 120 illustrates a scheduling sequence of the pico cell 100, which is subdivided in radio frames. The two time lines 120 and 220 are depicted in synchronization. There are radio frames, in which cell inner mobiles are preferably scheduled (blank radio frames), and radio frames, in which cell border mobiles are preferably scheduled (hachured radio frames). It is assumed that cell inner mobiles are located in the center part of the pico cell and cell border mobiles are located in the cell border part 110 of the pico cell. As can be seen from the two time lines 120 and 220 the pico cell schedules the inner cell mobiles during non-ABSs 34 and border cell mobile during ABSs 35 of the macro cell.

In this embodiment the controller 14 is further operable to schedule a data transmission from the pico cell 100 to the mobile 400 based on information on handover measurements from the mobile 400. The controller 14 is operable to determine whether the mobile 400 receives radio signals from the macro cell 200 with a signal strength above a threshold. The controller 14 is further operable to determine the configuration information on the measurement such that the mobile 400 performs measurements during more radio frames during ABSs of the macro cell 200, when the signal strength lies above the threshold. In other words the measurement configuration is adapted to the scheduling decision, i.e. whether the mobile 400 is considered a cell inner or a cell border mobile. FIG. 8 illustrates that mobiles located in the cell center of a pico cell may preferably be scheduled during non-protected resources (non-ABS), while mobiles located at the cell border 110 are preferably scheduled during protected resources (ABS). Furthermore, this decision may be based on handover events, e.g. handover A3 event, cf. 3GPP specifications on RRC. In this case, the mobile 400 signals to the pico cell 100, if the signal strength of the closest neighbor, i.e. in the embodiment depicted in FIG. 3 the surrounding macro cell 205, approaches the signal strength of the own pico cell 100 by a certain value, e.g. 3 dB, which can be implemented using a threshold decision.

Summarizing in embodiments, the pico cell 100 may try to determine the length of the filter or time interval by exploring the differences in the reported CQI between configuring different CQI reference sub-frames, e.g. #3 and #9 in FIG. 2. These measurements can be realized using periodic or A-periodic CQI measurements (A-CQI). As an example, sub-frame #3 is measured with P-CQI and sub-frame #9 with A-CQI. Hence, the A-CQI may correspond to an additional measurement. The controller 14 can be operable to determine information on another measurement configuration. The information on the other measurement configuration may comprise information on another signal quality measurement at the mobile 400 on radio signals received from the macro cell 200 during another, different time interval. If the difference between both CQIs is low, it can be assumed that the filter is very long and that the weighting of ABS and non-ABS corresponds to the percentages of ABS and non-ABS in an ABS period. On the other hand, if the difference is high, it can be assumed that the filter considers only a short time period, or even that no filtering is used, e.g. CQI is measured instantaneously, i.e. on a single sub-frame.

In a further embodiment Rel8/9 mobiles may use a very short filter. In this case, the pico eNB may have independent information about the channel conditions for protected and/or non-protected resources (provided by A-CQI and P-CQI, respectively). Therefore, a BLER control loop may only have to perform small corrections. This may result in an improvement of the system performance compared to the mobiles which use long filters, due to lower mismatch between reported CQI and used MCS, lower convergence time of BLER control algorithms, etc. In addition, higher bias values could be presumably used for this case.

A further embodiment may be applicable for Rel8/9 mobiles which use a very short filter. The CQI reference sub-frame may then be chosen such that the weighting of non-ABS sub-frames is optimized, e.g. sub-frame #3, according to the example shown on FIG. 2. If the resulting CQI value lies below a predefined threshold, e.g. 0 dB, the expected channel quality is too bad to allow a transmission during non-protected resources and the mobile will be scheduled during protected resources, i.e. macro ABS. Consequently, in case of short filters, the decision where to schedule the Rel. 8/9 mobile may be based on the reported CQI and the use of other methods like A3 events may not be necessary.

The above described embodiments mostly refer to a small cell 100 and macro cell 200 scenario, where the respective base station transceiver apparatus 10 is comprised in a small cell base station transceiver 100, which is interfered by a macro cell base station transceiver 200, applying the respective resource restrictions. In further embodiments the base station transceiver apparatus 10 is comprised in a first base station transceiver, which is interfered by a CSG cell or second base station transceiver, to which mobiles associated to the first base station transceiver may not be able to handover to. In these embodiments the CSG cell or second base station transceiver may apply the resource restrictions, e.g. ABS and non-ABS. The first base station transceiver may then use the exact same mechanisms as they are described above to configure the measurements at the mobile transceivers associated to it. Hence, the second base station transceiver 200 may then correspond to any CSG base station transceiver or cell. The first base station transceiver 100 may correspond to a macro cell or a small cell, which has an overlapping coverage area with the second base station transceiver 200. For example, a first macro cell base station transceiver 100 has an overlapping coverage area with a second CSG femto cell base station transceiver 200, the second CSG femto cell base station transceiver 200 may even be surrounded by the first macro cell base station transceiver 100.

Figure 9:
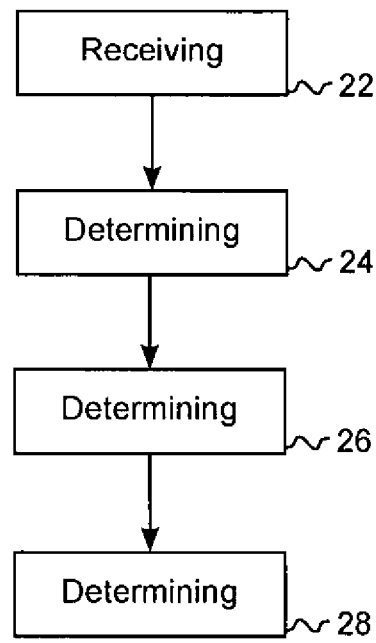
FIG. 9 shows a block diagram of a flowchart of an embodiment of a method for a base station transceiver.

FIG. 9 shows a block diagram of a flowchart of an embodiment of a method for a base station transceiver 100 for a mobile communication system 300. The base station transceiver 100 is operable in a coverage area 205 of another base station transceiver 200. The other base station transceiver 200 is operable to transmit radio signals in a repetitive sequence of radio frames. In at least one of the radio frames in the sequence the other base station transceiver 200 is operable to transmit with a reduced transmission power or to suspend transmission (e.g. ABS) compared to at least one other of the radio frames (non-ABS) in the sequence.

The method comprises a step of receiving 22 sequence information on the at least one of the radio frames in the sequence, during which the other base station transceiver 200 is operable to transmit with the reduced transmission power or to suspend transmission compared to the at least one other of the radio frames in the sequence. The method further comprises a step of determining 24 configuration information on a measurement configuration for a mobile transceiver 400 associated to the base station transceiver 100. The configuration information comprises information on a signal quality measurement at the mobile transceiver 400 on radio signals received from the base station transceiver 100. The signal quality measurement is performed during a time interval with a duration being predetermined by the mobile transceiver 400. The method further comprises a step of determining 26 duration information on the duration of the time interval and determining 28 the configuration information based on the sequence information and the duration information.

Moreover, embodiments may provide a computer program for performing one of the above methods, when the computer program is executed on a computer or processor or a programmable hardware component.

The description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Functional blocks denoted as "means for . . . " (performing a certain function) shall be understood as functional blocks comprising circuitry that is operable to perform a certain function, respectively. Hence, a "means for s.th." may as well be understood as a "means being adapted or suited for s.th.". A means being adapted for performing a certain function does, hence, not imply that such means necessarily is performing said function (at a given time instant).

Functions of various elements shown in the figures, including any functional blocks, such as "means for", "means for receiving", "means for transmitting", "means for controlling", may be provided through the use of dedicated hardware, as e.g. a processor, a receiver, a transmitter, a controller, etc., as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

Further, it is to be understood that the disclosure of multiple steps or functions disclosed in the specification or claims may not be construed as to be within the specific order. Therefore, the disclosure of multiple steps or functions will not limit these to a particular order unless such steps or functions are not interchangeable for technical reasons. Furthermore, in some embodiments a single step may include or may be broken into multiple sub steps. Such sub steps may be included and part of the disclosure of this single step unless explicitly excluded.

The invention claimed is:

1. An apparatus for a base station transceiver for a mobile communication system, wherein the base station transceiver is operable in a coverage area of another base station transceiver, wherein the other base station transceiver is operable to transmit radio signals in a repetitive sequence of radio frames, wherein in at least one of the radio frames in the sequence the other base station transceiver is operable to transmit with a reduced transmission power or to suspend transmission compared to at least one other of the radio frames in the sequence, the apparatus comprising:
an interface operable to receive sequence information on the at least one of the radio frames in the sequence, during which the other base station transceiver is operable to transmit with the reduced transmission power or to suspend transmission compared to the at least one other of the radio frames in the sequence; and
a controller operable to determine configuration information on a measurement configuration for being transmitted to a mobile transceiver associated to the base station transceiver, wherein the configuration information comprises information on a signal quality measurement at the mobile transceiver on radio signals received from the base station transceiver, the signal quality measurement being performed during a time interval with a preset duration and wherein the preset duration is unalterable through enhanced Inter-Cell Interference Coordination (eICIC) signaling, wherein the controller is further operable to determine duration information on the duration of the time interval from information gathered through a series of test measurements, wherein the configuration information is based on the sequence information and the determined duration information and wherein the controller is further operable to determine the duration information based on an identification of the mobile transceiver and an associated look-up table.

2. The apparatus of claim 1, further comprising a receiver operable to receive measurement information on measurement results measured by the mobile transceiver, the measurement information comprising information on a reception quality of radio signals received by the mobile transceiver from the base station transceiver based on the configuration information.

3. The apparatus of claim 2, wherein the configuration information on the measurement configuration comprises information positioning the time interval to a certain position in the sequence.

4. The apparatus of claim 3, wherein the controller is operable to determine updated sequence information based on the measurement information, wherein the interface is further operable to provide updated sequence information to the other base station transceiver, wherein the controller is operable to determine the duration information based on the updated sequence information and the measurement information.

5. The apparatus of claim 4, wherein the controller is operable to determine the updated sequence information such that a number of subsequent equal radio frames in the sequence during the time interval increases,
wherein during all of the subsequent equal radio frames the other base station transceiver is operable to transmit with the reduced transmission power or to suspend transmission compared to the at least one other of the radio frames in the sequence, or
wherein during all of the subsequent equal radio frames the other base station transceiver is operable to transmit with the regular transmission power.

6. The apparatus of claim 5, wherein the controller is operable to determine the duration information based on changes in measurement information for updated sequences.

7. The apparatus of claim 4, wherein the controller is further operable to schedule a data transmission from the base station transceiver to the mobile transceiver during a radio frame for which the other base station transceiver is operable to transmit with the reduced transmission power or to suspend transmission, or during a radio frame for which the other base station transceiver is operable to transmit with regular transmission power, based on the information on the corrected measurement results, and
wherein the controller is further operable to determine a corrected information on a measurement result based on the information on the at least one of the radio frames in the sequence, during which the other base station transceiver is operable to transmit with the reduced transmission power or to suspend transmission compared to the at least one other of the radio frames in the sequence, and based on the configuration, the corrected measurement information comprising information on a signal quality of the signals transmitted by the other base station transceiver and received by the mobile transceiver for radio frames, during which the other base station transceiver is operable to transmit with the reduced transmission power or to suspend transmission, and/or the corrected measurement information comprising information on a signal quality of the signals transmitted by the other base station transceiver and received by the mobile transceiver for radio frames, during which the other base station transceiver is operable to transmit with the regular transmission power.

8. The apparatus of claim 3, wherein the controller is operable to determine the duration information based on two or more measurement configurations, the two or more measurement configurations positioning the time interval to different positions within the sequence.

9. The apparatus of claim 8, wherein the controller is operable to determine the duration information based on changes in measurement information for the two or more measurement configurations.

10. The apparatus of claim 3, wherein the controller is operable to determine the duration information based on subsequent measurement configurations, wherein the controller is operable to determine the subsequent measurement configurations such that a number of subsequent equal radio frames of the sequence are measured, wherein during all of the subsequent equal radio frames the other base station transceiver is operable to transmit with the reduced transmission power or to suspend transmission compared to the at least one other of the radio frames in the sequence, or wherein during all of the subsequent equal radio frames the other base station transceiver is operable to transmit with the regular transmission power.

11. The apparatus of claim 3, wherein the controller is operable to determine the configuration comprising information on a reference radio frame in the sequence, the reference radio frame positioning the time interval for the measurements relative to the sequence, or wherein the controller is operable to determine the configuration information comprising information on a measurement repetition cycle corresponding to an integer multiple of a repetition cycle of the sequence.

12. The apparatus of claim 1, wherein the controller is operable to determine the configuration information, such that the time interval, having a predetermined duration, comprises as many radio frames, during which the other base station transceiver is operable to transmit with the reduced transmission power or to suspend transmission, as possible, or wherein the controller is operable to determine the configuration information, such that the time interval, having a predetermined duration, comprises as few radio frames, during which the other base station transceiver is operable to transmit with the reduced transmission power or to suspend transmission, as possible.

13. A method for a base station transceiver for a mobile communication system, wherein the base station transceiver is operable in a coverage area of another base station transceiver, wherein the other base station transceiver is operable to transmit radio signals in a repetitive sequence of radio frames, wherein in at least one of the radio frames in the sequence the other base station transceiver is operable to transmit with a reduced transmission power or to suspend transmission compared to at least one other of the radio frames in the sequence, the method comprising:

receiving sequence information on the at least one of the radio frames in the sequence, during which the other base station transceiver is operable to transmit with the reduced transmission power or to suspend transmission compared to the at least one other of the radio frames in the sequence;

determining configuration information on a measurement configuration for being transmitted to a mobile transceiver associated to the base station transceiver, wherein the configuration information comprises information on a signal quality measurement at the mobile transceiver on radio signals received from the base station transceiver, the signal quality measurement being performed during a time interval with a preset duration being and wherein the preset duration is unalterable through enhanced Inter-Cell Interference Coordination (eICIC) signaling;

determining duration information on the duration of the time interval from information gathered through a series of test measurements and based on an identification of the mobile transceiver and an associated look-up table; and determining the configuration information based on the sequence information and the determined duration information.

14. A non-transient computer readable medium carrying instructions for a processor which when executed by the processor cause the processor to perform the method of claim 13.

15. An apparatus for a base station transceiver for a mobile communication system, wherein the base station transceiver is operable in a coverage area of another base station transceiver, wherein the other base station transceiver is operable to transmit radio signals in a repetitive sequence of radio frames, wherein in at least one of the radio frames in the sequence the other base station transceiver is operable to transmit with a reduced transmission power or to suspend transmission compared to at least one other of the radio frames in the sequence, the apparatus comprising:

an interface operable to receive sequence information on the at least one of the radio frames in the sequence, during which the other base station transceiver is operable to transmit with the reduced transmission power or to suspend transmission compared to the at least one other of the radio frames in the sequence;

a controller operable to determine configuration information on a measurement configuration for being transmitted to a mobile transceiver associated to the base station transceiver, wherein the configuration information comprises information on a signal quality measurement at the mobile transceiver on radio signals received from the base station transceiver, the signal quality measurement being performed during a time interval with a preset duration and wherein the preset duration is unalterable through enhanced Inter-Cell Interference Coordination (eICIC) signaling, wherein the controller is further operable to determine duration information on the duration of the time interval from information gathered through a series of test measurements and wherein the configuration information is based on the sequence information and the determined duration information; and a receiver operable to receive measurement information on measurement results measured by the mobile transceiver, the measurement information comprising information on a reception quality of radio signals received by the mobile transceiver from the base station transceiver based on the configuration information, wherein the configuration information on the measurement configuration comprises information positioning the time interval to a certain position in the sequence, and wherein the controller is operable to determine updated sequence information based on the measurement information, wherein the interface is further operable to provide updated sequence information to the other base station transceiver, wherein the controller is operable to determine the duration information based on the updated sequence information and the measurement information.

* * * * *